(12) United States Patent
Eisenlauer

(10) Patent No.: US 12,495,953 B2
(45) Date of Patent: Dec. 16, 2025

(54) ENDOSCOPE WITH A LIGHT GUIDE DEVICE, METHOD OF MANUFACTURE OF AN ENDOSCOPE WITH A LIGHT GUIDE DEVICE AND USE OF A METHOD OF MANUFACTURING AN ENDOSCOPE

(71) Applicant: KARL STORZ SE & Co. KG, Tuttlingen (DE)

(72) Inventor: Johannes Eisenlauer, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 680 days.

(21) Appl. No.: 17/180,030

(22) Filed: Feb. 19, 2021

(65) Prior Publication Data
US 2021/0271069 A1   Sep. 2, 2021

(30) Foreign Application Priority Data
Mar. 2, 2020   (DE) ...................... 10 2020 105 469.6

(51) Int. Cl.
*A61B 1/00*   (2006.01)
*G02B 6/06*   (2006.01)
*G02B 23/24*   (2006.01)

(52) U.S. Cl.
CPC .............. *A61B 1/0011* (2013.01); *G02B 6/06* (2013.01); *G02B 23/2469* (2013.01)

(58) Field of Classification Search
CPC ........ A61B 2017/003; A61B 17/00234; A61B 1/07; A61B 1/018; A61B 1/05; A61B 2017/00477; A61B 1/0055; A61B 34/30; A61B 34/71; A61B 1/00096; A61B 2017/2905; A61B 90/361; A61B 2017/00314
See application file for complete search history.

(56) References Cited

U.S. PATENT DOCUMENTS

| | | | |
|---|---|---|---|
| 2006/0036132 A1* | 2/2006 | Renner | A61B 1/0011 600/920 |
| 2007/0118014 A1* | 5/2007 | Fuerst | A61B 1/00167 600/182 |
| 2015/0011838 A1 | 1/2015 | Auld et al. | |
| 2018/0235594 A1* | 8/2018 | Scheller | A61B 17/30 |
| 2019/0268581 A1* | 8/2019 | Miyazaki | A61B 1/00009 |

FOREIGN PATENT DOCUMENTS

EP   0 647 425 A1   4/1995

\* cited by examiner

*Primary Examiner* — Farhan Mahmud

(57) ABSTRACT

The present application provides a method for producing an endoscope having a light guide device. The method includes the providing an inner shaft for receiving imaging optics, disposing a guide segment for aligning the inner shaft in an outer shaft and/or for guiding light guide elements of the light guide device on the outer surface of the inner shaft, in a distal end section of the outer shaft, disposing the light guide elements on the outer surface of the inner shaft, inserting the inner shaft including the light guide elements into the outer shaft, a radially outer surface of the guide segment being in contact with an inner surface of the outer shaft, fixing the inner shaft and the light guide elements in the outer shaft, at least in the distal end section, the guide segment being realized directly on the outer surface by an additive manufacturing process.

17 Claims, 2 Drawing Sheets

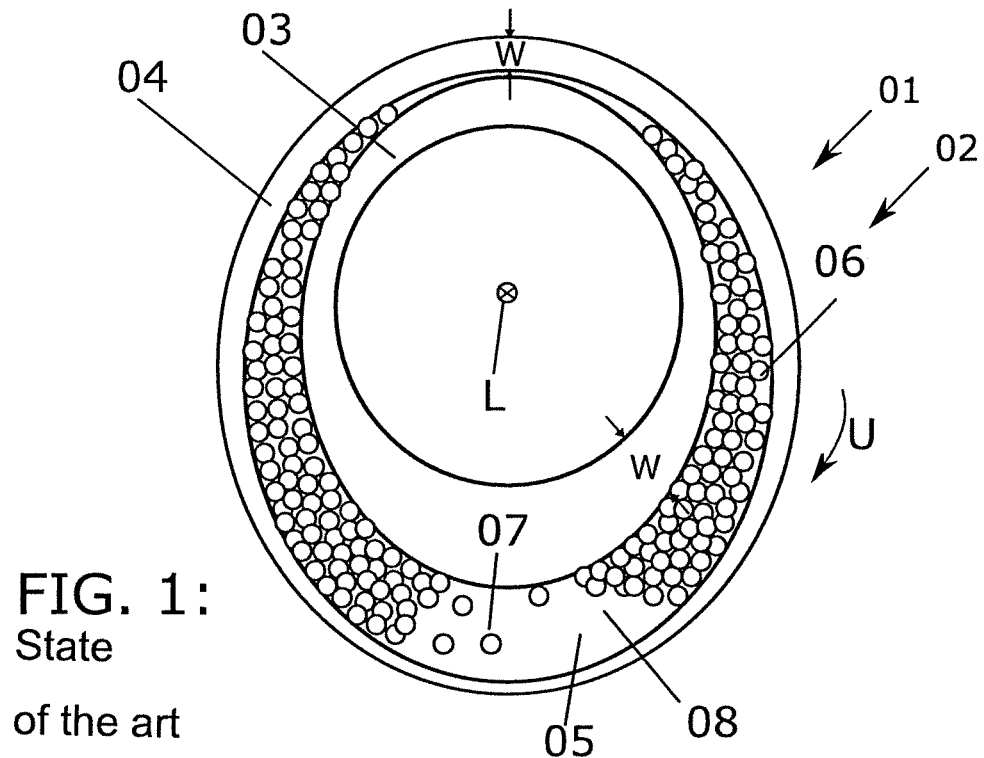
FIG. 1: State of the art
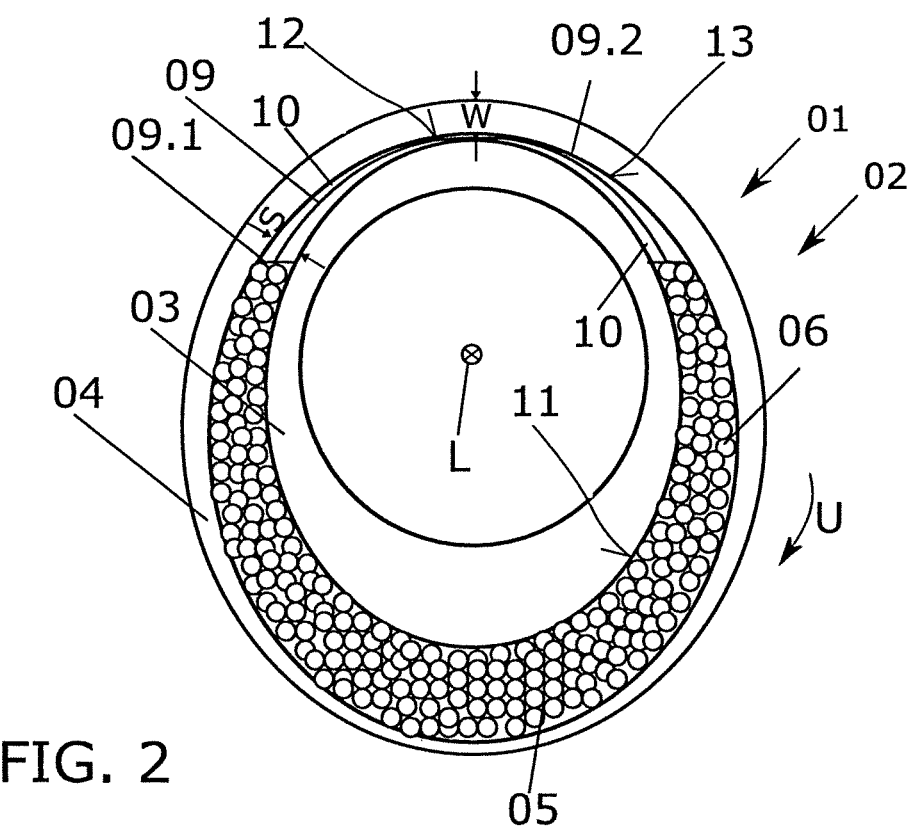
FIG. 2

ENDOSCOPE WITH A LIGHT GUIDE DEVICE, METHOD OF MANUFACTURE OF AN ENDOSCOPE WITH A LIGHT GUIDE DEVICE AND USE OF A METHOD OF MANUFACTURING AN ENDOSCOPE

TECHNICAL FIELD

The present invention relates to a method for producing an endoscope having a light guide device according to the preamble of claim 1. Furthermore, the present invention relates to a use of a method for producing an endoscope according to the preamble of claim 5. Additionally, the present invention relates to an endoscope having a light guide device according to the preamble of claim 6.

BACKGROUND OF THE INVENTION

In medical and technical endoscopy, illumination of the examined object is generally required. To generate illumination light which has a high luminous flux, separate light source devices or light source devices which are integrated into the proximal end of the endoscope are often used. The illumination light is transmitted from the proximal end to the distal end of the endoscope by means of one or several bundles of light guide elements of a light guide device.

In the state of the art, it is known to guide the light guide elements between an outer shaft and an inner shaft of the endoscope to the distal end, the outer surface of the outer shaft realizing the outer limit of the endoscope and the inner shaft being provided for the reception of imaging optics.

To achieve or allow an intended disposition of the inner shaft in relation to the outer shaft and to allow, at the same time, an intended disposition and alignment of the light guide elements in the distal end section of the endoscope in its fully or finally assembled state, guide segments or segments in general are known from the state of the art which are disposed on the outer surface of the inner shaft in the distal end section of the inner shaft and determine the alignment of the inner shaft in relation to the outer shaft by their shape in the radial direction or in the circumferential direction, in particular by a variable height or thickness in the radial direction, the extension or angular expansion of the segment or guide segment in the circumferential direction codetermining the position or disposition of the light guide elements in the distal end section of the endoscope and the shape of the segment or guide segment in the axial direction, in particular at circumferential edges extending in the radial direction, codetermining the alignment of the light guide elements.

In addition to the relative disposition between the outer shaft and inner shaft, the disposition and alignment of the light guide elements in the distal end section of the endoscope can thus be determined by the shape of the segment or guide segment; for example, an intended alignment, preferably at an angle to the axial extension of the inner and/or outer shaft, can thus be achieved in a uniform manner while the disposition of the light guide elements is bundled or concentrated.

In the state of the art, a multistage process or multistage method is normally provided in order to generate and/or dispose the segment or guide segment on the inner shaft. In a first stage, a blank or base body/green body of the segment or guide segment is soldered in the distal end section of the inner shaft. With respect to the external shape, said precursor of the final guide segment normally still has a uniform height, thickness or radial extension. To achieve a height or thickness of the guide segment that is variable in the circumferential direction, which is often required or intended, the assembly comprising the inner shaft and the precursor of the guide segment is then processed in a machining step, preferably by turning, in such a manner that the intended shape of the guide segment, in particular the intended circumferentially variable strength or height of the guide segment, is achieved.

A first general disadvantage of this method of production or provision of the assembly composed of the inner shaft and the guide segment is the relatively high number of processing steps. Additionally, brass is often used as the material of the guide element in the state of the art because it is easy to process by soldering and turning. However, the low biocompatibility and/or the classification of brass as an allergen can only be tolerated because the biochemical reactions which can potentially be triggered are low owing to the small surface of the guide elements. Another disadvantage is in particular the known method of fixing the blank of the guide segment or of connecting the inner shaft to the blank of the guide segment. This is because soldering using solder as a connection material can lead to problems with regard to adhesion, in particular in a following or subsequent mechanical, preferably machining, processing process; in the worst case, these problems result in the popping or spalling of the soldered guide segment or its precursor off the inner shaft.

The latter disadvantage occurs especially in endoscopes which have a small diameter, in particular a small diameter of the outer shaft. In such endoscopes, no sufficient adhesive effect can be generated by soldering a segment or a precursor of a guide segment, the adhesion of the guide segment to the inner shaft or to the outer surface of the inner shaft thus not being guaranteed with sufficient reproducibility in a subsequent machining process, in particular turning.

Said problems have collectively led to the fact that no corresponding guide segments are used in the state of the art for endoscopes which have a correspondingly small diameter, in particular a diameter of the outer shaft of ≤4 mm. However, this creates particular challenges in the manufacturing process of the known endoscopes which have a small diameter. Without the use and the effect of a guide segment described above, the disposition of the inner shaft in relation to the outer shaft and the disposition and alignment of the light guide elements, in particular in the distal end section of the endoscope, essentially depends on the skills, in particular the dexterity, of the respective assembly worker. However, this leads to the fact that the known endoscopes which have a small diameter can only be produced in a time-consuming manner employing workers who have relevant expertise and, at the same time, accepting significant amounts of reject.

SUMMARY OF THE INVENTION

Therefore, the object of the present invention is to overcome the disadvantages in the state of the art mentioned above and, in particular, to propose an endoscope and a method for producing an endoscope and a use of the method which allow a quick, safe and reliable disposition of a known guide segment on the outer surface of the inner shaft of the endoscope.

With respect to the method according to the invention, the object mentioned above is attained by the features of claim 1. With respect to the use of the method, the object according to the invention is attained by the features of claim 5. With respect to an endoscope according to the invention, the object is attained by the features of claim 6. Preferred embodiments are disclosed in the dependent claims.

The method according to the invention for producing an endoscope which has a light guide device initially provides the following method steps known per se:
  providing an inner shaft for receiving imaging optics;
  disposing a guide segment for aligning the inner shaft in an outer shaft and/or for guiding light guide elements of the light guide device on the outer surface of the inner shaft, in particular in a distal end section of the inner shaft;
  disposing the light guide elements on the outer surface of the inner shaft;
  inserting the inner shaft including the light guide elements into the outer shaft, a radially outer surface of the guide segment being in contact with an inner surface of the outer shaft;
  fixing the inner shaft and the light guide elements in the outer shaft, at least in the distal end section of the inner shaft and the outer shaft.

However, the invention provides that the guide segment is realized directly on the outer surface of the inner shaft by an additive manufacturing process. In other words, this means that, apart from the material of the inner shaft and the material of the guide segment, in particular no solder or other connection material is used in the fixation or connection. As will be explained in detail below, it is possible that a mixed material or a transition zone is formed in a transition area between the material of the inner shaft and the material of the guide segment, the transition zone having both materials and/or mixtures of both materials; however, no other material, such as solder, is used in the direct application of the guide segment onto the inner shaft.

The basic idea of the invention is thus based on the connection of the guide segment with the material of the guide segment directly on the outer surface of the inner shaft, for which a corresponding additive manufacturing process is used. This can significantly improve the adhesion of the guide segment to the inner shaft. At the same time, process steps can be simplified or even omitted, because the guide segment is realized directly on the outer surface of the inner shaft without having to generate and/or attach or apply the fixation material or intermediate layers of another material. Additionally, a particularly durable connection between the inner shaft and the guide segment is established by the direct application and realization of the guide segment on the inner shaft, in particular on its outer surface.

A first advantageous embodiment of the method can provide that the guide segment is realized in its final shape, in particular in its final geometric shape, on the outer surface of the inner shaft. The method for producing the assembly comprising the inner shaft and the guide segment is thus further simplified. In particular, separate production processes which may require a tool change or at least make it necessary to change between tool stations can be omitted. This is because, in contrast to the soldering of the guide segment and the subsequent turning or machining, the final shape or the final geometric shape of the guide segment can be directly generated if the guide segment is realized directly on the outer surface of the inner shaft by an additive manufacturing process, further processing steps or further processing measures of the assembly comprising the guide segment and the inner shaft thus being no longer necessary after the application of the guide segment.

Another preferred embodiment of the method provides that the guide segment is realized on the inner shaft by means of laser metal deposition, in particular of material which connects to the material of the inner shaft, preferably Monel. With respect to the present application, laser metal deposition (LMD) has particular advantages. Firstly, a uniform creation of an object can be guaranteed even on complex surfaces, in particular on strongly curved surfaces. Additionally, laser metal deposition generates a molten pool in an area directly adjacent to the substrate or the material onto which something is welded, i.e., in the present case, the surface of the inner shaft; in the molten pool, the materials mix or merge into one another, a particularly strong and permanent connection between the object produced by laser metal deposition and the underground or substrate thus being established. The applied material can be selected primarily on the basis of its connection properties with the material of the inner shaft and additionally with respect to biocompatibility. The suitability for subsequent workability can be neglected, because the method according to the invention allows the possibility of eliminating the need for subsequent processing steps, in particular machining. In this way, the use of brass as the material for the guide element is not required in the method according to the present invention.

Another embodiment of the method according to the invention provides that the guide segment is realized as a multi-layer, preferably multi-piece, structure element on the outer surface of the inner shaft. A multi-layer realization of the guide segment allows a thickness of the guide segment which varies in the circumferential direction, for example, to be realized particularly advantageously by producing different numbers of layers in different areas in the circumferential direction by means of the additive manufacturing process, for example laser metal deposition. In this way, the guide segment can particularly advantageously be generated directly in its final shape without the need for subsequent processing steps or forming processes. The guide segment can particularly advantageously be realized in multiple pieces. In conventional guide segments which are initially soldered in a precursor or a blank and which are then given their final shape by turning, the thickness of the guide segment can be reduced to 0 or almost 0 in some areas, two almost or two actually separated sections of the guide segment thus being realized on the outer surface of the inner shaft after the soldering of a single or connected precursor. This form of turning is another specific requirement for the production process of known guide segments, because specific requirements for the processing step itself and for the connection between the guide segment and the inner shaft must be met when the thickness of the guide segment is reduced to almost 0 or to 0 in areas in the circumferential direction. The direct realization of the guide segment as a multi-piece mold or geometry allows the corresponding method steps to be dispensed with, which also reduces or simplifies the requirement for the realization of the guide segment.

With respect to the use of the method described above, the object mentioned above is attained by using the described method in the production of an endoscope which has an outer shaft which has an outer diameter of ≤4 mm, preferably of ≤3 mm, particularly preferably of ≤2 mm.

In principle, guide segments can advantageously be produced on inner shafts of endoscopes which have a larger outer diameter by means of the method mentioned above. As described above, a plurality of advantages compared to the state of the art can be realized irrespectively of the diameters in the method according to the invention. However, the use within the scope of the production of endoscopes which have a small outer diameter, in particular a small outer diameter according to the limits mentioned above, is of particular note. As indicated above, the use of guide segments or the application of guide segments for such small or thin endoscopes has not been possible so far, at least not by means of the known methods and processes.

For the first time, the use allows guide segments to be realized or disposed on the outer surface of inner shafts of endoscopes which have a total outer diameter of ≤4 mm after assembly in a compact and economically viable method which is very reliable.

The use of the method described above can particularly advantageously be used in endoscopes for which a rod lens for transmitting image information is used in the inner shaft on which the guide segment is disposed or realized.

With respect to an endoscope having a light guide device and comprising an inner shaft for receiving imaging optics, a guide segment for aligning the inner shaft in an outer shaft and/or for guiding light guide elements of the light guide device on the outer surface of the inner shaft being disposed on the inner shaft, in particular in a distal end section of the outer shaft, and the light guide elements extending between the outer surface of the inner shaft and an inner surface of the outer shaft to a distal end of the endoscope and the endoscope further having fixation means for fixing the inner shaft and the light guide elements in the outer shaft, at least in the distal end section of the inner shaft and of the outer shaft, the object mentioned above is attained by disposing the guide element directly on the outer surface of the inner shaft by an additive manufacturing process.

The direct realization or application of the guide segment on the outer surface of the inner shaft enables sufficient strength or sufficient stability of the connection between the inner shaft and the guide segment.

Advantageously, this direct connection can be established by means of an additive manufacturing process, whereby manufacturing steps or production steps can be left out collectively compared to the state of the art.

With respect to the advantages and advantageous effects of the realization of the endoscope according to the invention, reference is made to the description above of the correspondingly analogous method according to the invention. In this context, it should be noted that disclosed features relating to the method are also seen as relating to the device and vice versa, where required.

A first, particularly advantageous embodiment of the endoscope can provide that the endoscope has an outer shaft which has an outer diameter of ≤4 mm, preferably of ≤3 mm, particularly preferably of ≤2 mm. The direct realization of the guide segment on the outer surface of the inner shaft by means of an additive thinning process allows a guide segment to be reliably disposed on the inner shaft for the first time and consequently allows the light guide elements to be reliably and reproducibly disposed and aligned, in particular in the distal end section of the endoscope, for the first time for such small or thin endoscopes; the requirements for the work steps in the manufacturing or assembly process, in particular the requirements for assembly workers, can thus be less stringent, because the disposition and alignment of the light guide elements and the disposition of the inner shaft in the outer shaft do no longer predominantly depend on the precision and the experience of the assembly workers.

Another advantageous embodiment of the endoscope can additionally provide that the guide segment is made of a material which connects to the material of the inner shaft, preferably Monel, preferably by laser metal deposition. As explained above, the material selection can therefore be optimized, because the subsequent workability of the material of the guide segment is not of importance or not of great importance.

Another particularly preferred embodiment of the endoscope can provide that the guide segment is realized as a multi-layer, preferably multi-piece, structure element on the outer surface of the inner shaft. The realization in multiple layers, which can preferably be represented in the additive manufacturing process, allows the guide segment to be directly generated or realized in the intended shape, in particular the intended external shape and, if applicable, varying thicknesses, depending on the orientation in the circumferential direction, the guiding and alignment of the light guide elements and the alignment of the inner shaft in the outer shaft thus being guaranteed. Additionally, the multi-layer and, if applicable, multi-piece realization as a structure element allows a precise and, if applicable, eccentric orientation of the inner shaft in the outer shaft.

Another preferred embodiment of the endoscope provides that the endoscope has optics which are disposed in the inner shaft and which comprise a rod lens for transmitting image information.

BRIEF DESCRIPTION OF THE DRAWINGS

Advantageous embodiments and effects of the invention described above are apparent from the following description of the purely schematic figures.

In the figures,

FIG. 1 shows a schematic illustration of a distal end section of an endoscope according to the state of the art;

FIG. 2 shows a schematic illustration of a distal end section of an endoscope according to the present invention;

DETAILED DESCRIPTION

Figure 3:
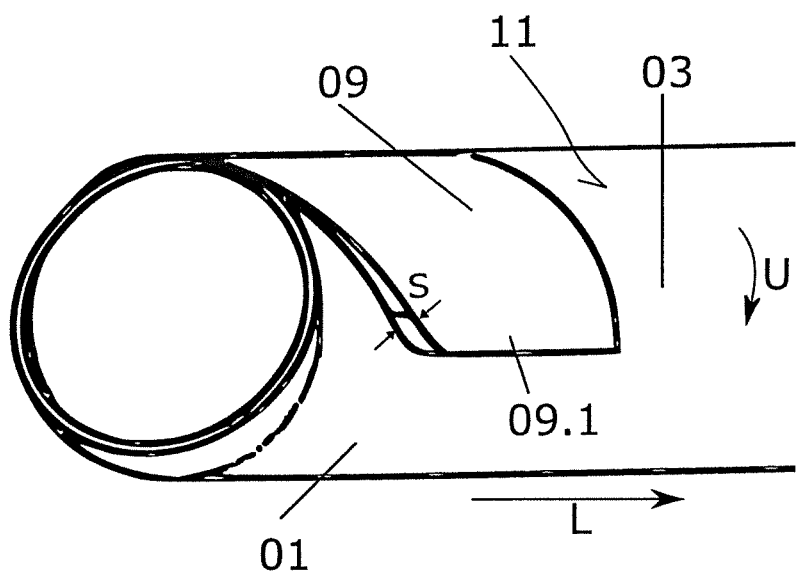
FIG. 3 shows a schematic illustration of a distal end section of an inner shaft for use in the method according to the invention.

FIG. 1 shows a schematic illustration of a distal end section 01 of an endoscope 02. The view of FIG. 1 extends along an axial alignment, i.e., along a shared longitudinal axis L of the inner shaft and the outer shaft. Inner shaft 03 is intentionally guided in a slightly eccentric manner in outer shaft 04. The non-uniform wall thicknesses W of inner shaft 03 and of outer shaft 04 in circumferential direction U show that distal end section 01 is aligned or cut at an angle to longitudinal direction L.

In gap 05 between inner shaft 03 and outer shaft 04, the ends of light guide elements 06 can be seen which are realized as bundled optical fibers or light guides, for example. For the sake of clarity, the illustration of the FIG. shows light guide elements 06 significantly enlarged/thicker than in reality. FIG. 1 shows that the ends of light elements 06 are unevenly distributed in circumferential direction U in an unwanted or not very desirable manner in the area of distal end section 01 and that very few light guide elements 06 are disposed in particular in an area 07 of gap 05 or that no light guide elements 06 are disposed in some areas at all. This leads to an unwanted or undesired illumination situation. In the course of the assembly, gap 05 in area 07 is filled with fixation means 08 in the form of adhesion promoters or adhesive, for example, which also ensures the fixation or securing of the inner shaft in the outer shaft and the securing and fixation of light guide elements 06 in distal end section 01.

FIG. 1 shows a distal end section 01 of an endoscope which has a small diameter, in particular a small outer diameter of outer shaft 04, which is ≤4 mm or even ≤3 mm, for example. In such small or thin endoscopes and corresponding distal end sections 01, the situation shown in an exemplary manner in FIG. 1 was inevitable in some assembly cases, because, to date, it has not been possible, at least not in a reproducible and economically feasible manner, for a guide segment improving the positioning of inner shaft 03 in outer shaft 04 and the disposition and alignment of light guide elements 06 to be disposed or realized on inner shaft 03 for endoscopes which have said dimensions.

As schematically shown in FIG. 2, the present invention, i.e., the endoscope according the invention and the method according to the invention, makes this very realization or disposition of a guide segment 09 possible in an advantageous manner not only in principle, but particularly preferably also for endoscopes which have small outer diameters.

Compared to FIG. 1 in particular, FIG. 2 shows an identically oriented view of a distal end section 01 of an endoscope 02, in which a guide segment 09 according to the invention is disposed in a part of gap 05 between inner shaft 03 and outer shaft 04. As is readily clear, guide segment 09 ensures the intended disposition and alignment of light guide elements 06 and the intended alignment of inner shaft 03 in outer shaft 04, in particular in distal end section 01.

Guide segment 09 is realized as a multi-layer or multi-piece structure element, which is indicated by layers 10 and individual parts 09.1 and 09.2. Individual layers 10 are generated in an additive manufacturing process, for example in a laser metal deposition process, guide segment 09 being generated in such a manner that it is realized and/or disposed directly on outer surface 11 of inner shaft 03 in its final shape and in particular without further processing steps. A machining step, preferably configured to realize different thicknesses S of guide segment 09 in circumferential direction U, can therefore be left out or dispensed with, in particular for endoscopes 02 which have a small diameter. It is clearly visible that the distribution of light elements 06 is improved compared to FIG. 1 and that the alignment of inner shaft 03 in outer shaft 04 can also be realized in a simpler and more reproducible manner if, during the insertion of inner shaft 03 into outer shaft 04, radially outer surface 12 of guide segment 09 comes into contact with and/or is guided along inner surface 13 of outer shaft 04 until the distal end of inner shaft 03 together with light guide elements 06 has reached the distal end of outer shaft 04.

FIG. 3 shows an exemplary design of a part 09.1 of a guide segment 09 realized as a structure element in multiple pieces on distal end section 01 of an inner shaft 03. The perspective view of FIG. 3 shows that guide segment 09 has a varying wall thickness S in circumferential direction U and that guide segment 09 has different sections which have both straight and curved contours in the axial direction or in the direction of longitudinal axis L. Such a final shape of guide segment 09 can particularly advantageously be realized directly on outer surface 11 of inner shaft 03 by an additive manufacturing process, for example by laser metal deposition on outer shaft 03. For the sake of clarity, a preferred multi-layer design of guide segment 09 is not shown in the illustration of FIG. 3.

Figure 4:
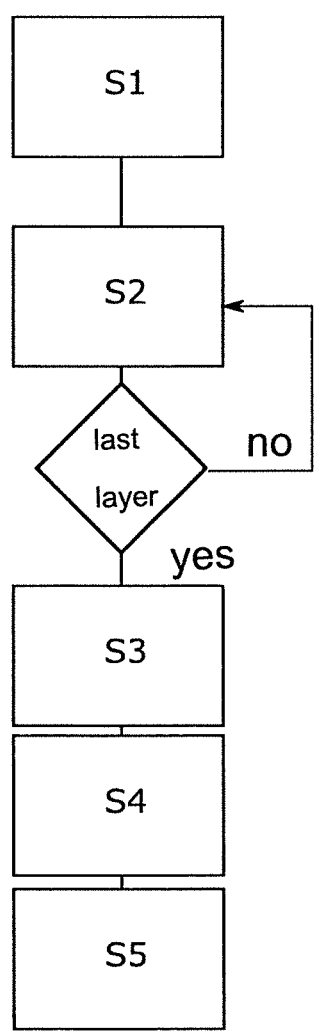
FIG. 4 shows a schematic illustration of a sequence diagram of the method according to the invention.

FIG. 4 shows an exemplary and heavily simplified sequence diagram of a method according to the invention. For the sake of clarity, known individual steps within the scope of the production or manufacturing of an endoscope, in particular within the scope of the production of an endoscope which has a small outer diameter, preferably of ≤4 mm, are not shown, but are considered part of the overall process.

In the stage of the overall production process or production method relevant according to the invention, an inner shaft for receiving imaging optics is provided in a first method step S1. In a subsequent method step S2, a first layer is realized in one or several separate areas or sections of the end section of the inner tube by means of an additive manufacturing process, for example by means of laser metal deposition, in sections or areas of the distal end section of the inner shaft. By means of the application of additional layers, each additional layer being realized on the preceding layer and/or on the outer surface of the inner shaft, method step S2 is performed until the entire guide segment is realized in its final shape on the inner shaft and until the last layer is applied.

The guide segment is particularly advantageously applied directly on the inner shaft, for example by realizing a welded joint between the material of the inner shaft on the one side and the first layer of the guide segment on the other side.

After the recursive realization of the guide segment on the inner shaft in the course of method step S2, the light guide elements of the light guide device are disposed on the outer surface of the inner shaft and come into contact with the guide segment in method step S3. In a subsequent method step, the inner shaft including the light guide elements is inserted into the outer shaft, the radially outer surface of the guide segment coming into contact with the inner surface of the outer shaft. This is to be performed in exemplary method step S4.

In subsequent method step S5, the inner shaft and the light guide elements can be fixed in the outer shaft, at least in the distal end section of the inner shaft and of the outer shaft, using an adhesion promoter or adhesive, for example.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

REFERENCE SIGNS 01 distal end section
02 endoscope
03 inner shaft
04 outer shaft
05 gap
06 light guide element
07 area
08 fixation means
09 guide segment
09.1 first part
09.2 second part
10 layer
11 outer surface of the inner shaft
12 outer surface of the guide segment
13 inner surface of the outer shaft
W wall thickness
S thickness of the guide segment (radial)
U circumferential direction
L longitudinal direction (inner shaft and outer shaft)
S1-S5 method steps

I claim:

1. An endoscope comprising:
a plurality of light guide elements;
an inner shaft for receiving imaging optics;
an outer shaft concentric to the inner shaft, wherein an inner surface of the outer shaft is spaced apart from an outer surface of the inner shaft so as to define a gap concentric to the inner shaft, the gap including a first portion and a second portion, the first portion and the second portion defining an entirety of the gap and wherein the first portion is shaped differently than the second portion;
a guide segment disposed on a distal end of the inner shaft and the outer shaft and disposed entirely within and filling the first portion of the gap, wherein the plurality of light guide elements are disposed within and fills the second portion of the gap.

2. The endoscope as set forth in claim 1, wherein the outer shaft of the endoscope has an outer diameter of ≤4 mm.

3. The endoscope as set forth in claim 1, wherein the guide segment is made of a material which is connected to the material of the inner shaft by laser metal deposition.

4. The endoscope as set forth in claim 1, wherein the guide segment is realized as a multi-layer structure element on the outer surface of the inner shaft.

5. The endoscope as set forth in claim 1, wherein the outer shaft of the endoscope has an outer diameter of ≤3 mm.

6. The endoscope as set forth in claim 1, wherein the guide segment includes a first member, a second member and a center, the first member symmetric to the second member.

7. The endoscope as set forth in claim 6, wherein a thickness of the first member and the second member increases from the center to a distal end of a respective first member and second member.

8. The endoscope as set forth in claim 7, wherein the guide segment is formed of layers of material.

9. The endoscope as set forth in claim 1, wherein the guide segment has a varying thickness.

10. The endoscope as set forth in claim 1, wherein the guide segment includes a plurality of sections, wherein one of the plurality of sections has a curved contour and another one of the plurality of sections has a smooth contour.

11. The endoscope as set forth in claim 7, wherein an area of a cross-section of the guide segment taken along a radius of the outer shaft is less than an area of a cross-section of the plurality of light guide segments taken along the radius of the outer shaft.

12. A method for producing an endoscope having a plurality of light guide elements, the method comprising the following method steps:
providing an inner shaft for receiving imaging optics, the inner shaft having a distal end section and an outer circumferential surface, the outer circumferential surface including a first portion and a second portion, the first portion and the second portion defining an entirety of the outer circumferential surface;
using an additive manufacturing process to form a guide segment on a distal end of the inner shaft, wherein the guide segment is disposed only on the first portion of the outer surface;
disposing the light guide elements only on the second portion of the outer surface of the inner shaft;
inserting the inner shaft including the light guide elements into the outer shaft, wherein in the step of forming the guide segment the guide segment is formed such that a radially outer surface of the guide segment is in contact with an inner surface of the outer shaft;
fixing the inner shaft and the light guide elements in the outer shaft, at least in the distal end section of the inner shaft and the outer shaft.

13. The method as set forth in claim 12, wherein the guide segment is realized on the inner shaft by means of laser metal deposition (LMD), in particular of material which connects to the material of the inner shaft.

14. The method as set forth in claim 12, wherein the guide segment is realized as a multi-layer structure element on the outer surface of the inner shaft.

15. The method as set forth in claim 12, further including the step of forming a transition area between a material of the inner shaft and a material of the guide segment, wherein the transition area consists of both materials and/or a mixture of both materials.

16. The method as set forth in claim 12, wherein the outer shaft has an outer diameter of ≤4 mm.

17. The method as set forth in claim 12, wherein the outer shaft has an outer diameter of ≤4 mm.

* * * * *